(12) United States Patent
Moon et al.

(10) Patent No.: US 10,390,106 B2
(45) Date of Patent: Aug. 20, 2019

(54) DEVICE AND METHOD FOR PROCESSING IMAGE

(71) Applicant: Samsung Electronics Co., Ltd., Suwon-si, Gyeonggi-do (KR)

(72) Inventors: Han-Gil Moon, Seoul (KR); Nam-Suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 15/193,713

(22) Filed: Jun. 27, 2016

(65) Prior Publication Data

US 2017/0094372 A1    Mar. 30, 2017

(30) Foreign Application Priority Data

Sep. 25, 2015  (KR) ................ 10-2015-0136192

(51) Int. Cl.
   *G06F 21/62*     (2013.01)
   *H04N 21/8352*   (2011.01)
   *H04N 21/2743*   (2011.01)
   *H04N 21/4402*   (2011.01)
   *H04N 21/4405*   (2011.01)
   *H04N 21/4408*   (2011.01)
   *H04N 21/845*    (2011.01)
   *H04N 21/2347*   (2011.01)

(52) U.S. Cl.
   CPC ... *H04N 21/8352* (2013.01); *H04N 21/23476* (2013.01); *H04N 21/2743* (2013.01); *H04N 21/4405* (2013.01); *H04N 21/4408* (2013.01); *H04N 21/44055* (2013.01); *H04N 21/440263* (2013.01); *H04N 21/8455* (2013.01)

(58) Field of Classification Search
   CPC .............. H04L 63/0428; G06F 21/62
   See application file for complete search history.

(56) References Cited

U.S. PATENT DOCUMENTS

| | | |
|---|---|---|
| 2003/0086568 A1 | 5/2003 | Kato et al. |
| 2010/0158410 A1* | 6/2010 | Kusakabe ............... G06T 1/00 382/284 |
| 2015/0035999 A1 | 2/2015 | Shehane et al. |
| 2016/0037057 A1* | 2/2016 | Westin ............ H04N 5/23222 348/207.1 |
| 2018/0046814 A1* | 2/2018 | Manoharan ........... G06F 21/62 |

OTHER PUBLICATIONS

Wikipedia, JPEG File Interchange Format, Jun. 10, 2015, XP-002766681, https://en.wikipedia.org/w/index.php?title=JPEG_File_Interchange_Format&oldid=667566850 (retrieved Feb. 2, 2017).

* cited by examiner

*Primary Examiner* — Izunna Okeke

(74) *Attorney, Agent, or Firm* — Jefferson IP Law, LLP

(57) ABSTRACT

A device and a method for processing an image by a multimedia device that supports encryption and decryption are provided. The device includes a thumbnail image of an original image is obtained and the original image is encrypted using a first encryption scheme. An encrypted image frame is generated such that the encrypted image frame includes an identity field in which marker information is recorded between a first image field in which the obtained thumbnail image is recorded and a second image field in which the encrypted original image is recorded. The marker information indicates whether the encrypted image frame includes the second image field.

20 Claims, 8 Drawing Sheets

| SOI | Header | Payload | EOI |

FIG.5A

| SOI | Header | Thumbnail | EOI | Encrypted Payload |

FIG.5B

| SOI | Header | Fake Payload | EOI | Extra Info | Encrypted Payload |

FIG.5C

DEVICE AND METHOD FOR PROCESSING IMAGE

CROSS-REFERENCE TO RELATED APPLICATION(S)

This application claims the benefit under 35 U.S.C. § 119(a) of a Korean patent application filed on Sep. 25, 2015 in the Korean Intellectual Property Office and assigned Serial number 10-2015-0136192, the entire disclosure of which is hereby incorporated by reference.

TECHNICAL FIELD

The present disclosure relates to a device and method for processing an image in a multimedia device that supports encryption and decryption.

BACKGROUND

Recently, broadcasting services have been generally provided in the form of video communication services integrated with communication services. The video communication services are based on a broadband network that provides high-speed information delivery on a multimedia device capable of fast information processing.

The multimedia device supporting the video communication service consumes a lot of power due to image processing. In particular, a resolution of an image to be processed may be a main factor that determines a power consumption of the multimedia device in a display operation. For example, in a portable multimedia device (hereinafter, referred to as a 'portable terminal'), a power consumption during a display operation may increase in proportion to a resolution of an image to be processed.

An increase in the resolution of the image may cause an increase in a bandwidth on a link in which information about the image to be processed is to be delivered. For example, a bandwidth consumed by one multimedia device to deliver multimedia data to a cloud server may increase in proportion to a type, a resolution, or the like of target multimedia. In another example, when one multimedia device delivers multimedia data to another multimedia device over a network, a bandwidth to be used may increase in proportion to a type, a resolution, or the like that determines a size of the multimedia data to be delivered.

For these reasons, most multimedia devices use various encoding and decoding techniques to reduce the amount of information of multimedia data. The encoding and decoding techniques allow efficient use of a capacity of a recording medium such as a memory and a bandwidth of a transmission medium.

Codecs that support encoding and decoding of the multimedia data have been developed for types of multimedia to improve encoding efficiency. For example, codecs for still images may include joint photographic experts group (JPEG), JPEG 2000, lossless JPEG, portable network graphics (PNG), picture motion browse (PMB), and so forth, and codecs for moving images may include motion JPEG, moving picture experts group (MPEG)-1, MPEG-2, MPEG-4, H.263, H.264, high efficiency video coding (HEVC), and so forth. Codecs for audio may include MPEG-1 layer I, MPEG-1 layer II, MPEG-1 layer III, advanced audio coding (AAC), high-efficiency (HE)-AAC, free lossless audio codec (FLAC), and so forth. Codecs for voice may include G.711, G.718, adaptive multi-rate (AMR), AMR-wideband (WB), and so forth.

The multimedia device may use different codecs by taking encoding efficiency into account, even for the same type of media. For example, a first multimedia device may use JPEG as a codec for still images, and a second multimedia device may use PNG as a codec for still images.

As another issue, the multimedia device needs to have a protection scheme for produced and consumed multimedia data. For example, the multimedia device has to be capable of encrypting produced multimedia data or decrypting encrypted multimedia data for consumption.

Generally, in the multimedia device, encoding and decoding and encryption and decryption may not be easily compatible with each other. To maintain codec compatibility, encryption and decryption have to be processed at a level prior to encryption, that is, a value level. For example, when encoded multimedia data is encrypted, the multimedia device entropy-decodes the encoded multimedia data, encrypts the entropy-decoded multimedia data, and then entropy-encodes the encrypted multimedia data. On the other hand, when encrypted multimedia data is decoded, the multimedia device entropy-decodes the encrypted multimedia data, decrypts the entropy-decoded multimedia data, and then entropy-encodes the decrypted multimedia data.

When the multimedia data is a still image or a moving image, the multimedia device may provide a low-resolution image. The low-resolution image may be a thumbnail image. The multimedia device may use a thumbnail image to identify the multimedia data.

The low-resolution image may be generated by a personal computer (PC), a smartphone, a cloud server, or the like by using still image or moving image information based on a corresponding policy. Thus, when the multimedia data is encrypted, the low-resolution image may also be encrypted. In this case, the identification of the low-resolution image by another multimedia device may be restricted.

To address this problem, a complicated procedure needs to be performed. For example, an encrypted image has to be decrypted and a low-resolution image has to be generated from the decrypted image. However, even for the low-resolution image generated in this way, a scheme for forming an organic relationship with the encrypted original image is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image processing device and method that may support compatibility between encoding and decoding and encryption and decryption in a multimedia device.

Another aspects of the present disclosure is to provide an image processing device and method by which a low-resolution image may be easily identified without decryption in a multimedia device that supports encryption and decryption.

Another aspect of the present disclosure is to provide an image processing device and method in which encryption and decryption of an image are performed to enable identification of a low-resolution image without encryption and decryption in a multimedia device.

Another aspect of the present disclosure is to provide an image processing device and method that configures a multimedia frame based on encryption to facilitate identification of a low-resolution image without decryption in a multimedia device.

Another aspect of the present disclosure is to provide an image processing device and method that allows identification of an original image stored in a cloud server by using a low-resolution image in a multimedia device.

Another aspect of the present disclosure is to provide a multimedia device capable of identifying an original image stored in a cloud server by sharing a low-resolution image and a method for supporting the multimedia device.

In accordance with an aspect of the present disclosure, a method for processing an image by a multimedia device is provided. The method includes obtaining a thumbnail image of an original image, encrypting the original image using a first encryption scheme, and generating an encrypted image frame such that the encrypted image frame includes an identity field in which marker information is recorded between a first image field in which the obtained thumbnail image is recorded and a second image field in which the encrypted original image is recorded, in which the marker information indicates whether the encrypted image frame includes the second image field.

In accordance with another aspect of the present disclosure, a device for processing an image is provided. The device includes an input interface, an image processor configured to obtain a thumbnail image of an original image included in an image frame provided by the input interface, to encrypt the original image using a first encryption scheme, and to generate an encrypted image frame such that the encrypted image frame includes an identity field in which marker information is recorded between a first image field in which the obtained thumbnail image is recorded and a second image field in which the encrypted original image is recorded, and an output interface configured to output the encrypted image frame generated by the image processor, in which the marker information indicates whether the encrypted image frame includes the second image field.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A to 5C illustrates examples of an image frame and an encrypted image frame are applied to a multimedia device that encodes an original image by using joint photographic experts group (JPEG) according to various embodiments of the present disclosure;

Throughout the drawings, like reference numerals will be understood to refer to like parts, components, and structures.

DETAILED DESCRIPTION

Figure 1:
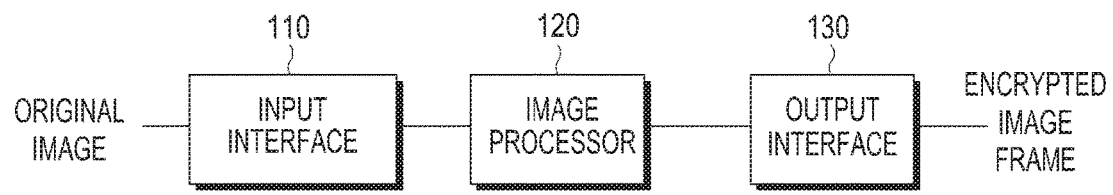
FIG. 1 is a block diagram of an image processing device that performs encoding with respect to an original image in a multimedia device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation or at a memory device.

Terms defined in the present disclosure are used for only describing a specific embodiment and may not have an intention to limit the scope of other various embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present various embodiments.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an Moving Picture Experts Group phase 1 or phase 2 (MPEG-1 or MPEG-2) audio layer 3 (MP3) player, mobile medical equipment, a camera, and a wearable device (e.g., smart glasses, a head-mounted device (HMD), an electronic cloth, an electronic bracelet, an electronic necklace, an accessory, an electronic tattoo, a smart mirror, or a smart watch).

According to various embodiments of the present disclosure, the electronic device may be a smart home appliance. The home appliance may include, for example, at least one of a television (TV), a digital video disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync~, Apple TV™, or Google TV™), a game console (e.g., Xbox™ or PlayStation™), an electronic dictionary, an electronic key, a camcorder, and an electronic frame.

According to an embodiment of the present disclosure, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.).

According to various embodiments of the present disclosure, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

In various embodiments to be proposed in the present disclosure, an image may refer to both a still image and a moving image. A still image or a moving image before undergoing image processing such as encryption or the like will be referred to as an "original image". A thumbnail image obtained from the original image to identify or find the original image will be referred to as a "low-resolution image". The low-resolution image may be generated by extracting an image in a particular region from the original image, generating a related image from meta information of the original image, changing the size of the original image, or blurring the original image to allow a user to identify the original image.

The original image may be encoded by a predetermined encoding scheme, and the encoded image may be decoded into the original image by using a decoding scheme corresponding to the predetermined encoding scheme. A codec for encoding and decoding is a representative technique for efficiently recording data in a limited storage area of a memory. The codec has been developed from type to type of data to improve encoding efficiency.

In various embodiments to be proposed in the present disclosure, the original image may be protected by a predetermined encryption scheme. The encrypted original image may be decrypted by a decryption scheme corresponding to the predetermined encryption scheme. The low-resolution image may also be protected by a predetermined encryption scheme. The encrypted low-resolution image may be decrypted by a decryption scheme corresponding to the predetermined encryption scheme. For example, for encryption of the low-resolution image, a parameter to be encrypted may be selected or particular bits of the parameter to be encrypted may be selected. In this case, encryption of the low-resolution image may be performed on the selected parameter or the selected bits of the parameter.

In various embodiments to be proposed in the present disclosure, a scheme is proposed in which the original image is provided as an image frame having a predetermined format and a multimedia device reconfigures the image frame as an encrypted image frame to facilitate compatibility of the low-resolution image corresponding to the original image. As one scheme, an encrypted image frame may be configured in which the encoded original image included in the image frame is encrypted and arranged behind identity information and the low-resolution image generated by the encoded original image is arranged in front of the identify information. In this case, the multimedia device may easily decode the low-resolution image from the encrypted image frame. The multimedia device may recognize that there is no more data to be decoded because of the identity information included in the encrypted image frame.

The number of encoded original images arranged after the identity information in the encrypted image frame is not necessarily limited to one. For example, when multiple encoded original images are arranged after the identity information, a plurality of image fields corresponding to each of the multiple encoded original images may be added. The number of low-resolution images arranged in front of the identity information may not be necessarily limited to one. For example, a plurality of image fields corresponding to each of the multiple low-resolution images may be added.

When the multiple encoded original images are arranged behind the identity information, the identity information may be added between the encoded original images. The added identity information may be used to distinguish the encoded original image arranged in front of the identity information from the encoded original image arranged behind the identity information.

Moreover, in the encrypted image frame, the number of encoded original images arranged behind the identity information may not be necessarily equal to the number of low-resolution images arranged in front of the identity information. For example, one encoded original image may be arranged behind the identity information and multiple low-resolution images may be arranged in front of the identity information. On the other hand, multiple encoded original images may be arranged behind the identity information and one low-resolution image may be arranged in front of the identity information.

The identity information included in the encrypted image frame may also be single or multiple based on the number of encoded original images and/or the number of low-resolution images.

In the encrypted image frame, the encoded original image arranged behind the identity information may be resized based on the low-resolution image arranged in front of the identity information. For example, data corresponding to an area overlapping with the low-resolution image may be removed from the encoded original image, and only data corresponding to the remaining area of the encoded original image may be arranged behind the identity information.

In various embodiments to be proposed in the present disclosure, a scheme is proposed in which a multimedia device delivers an encoded image frame reconfigured based on an image frame generated by encoding according to a predetermined encoding scheme to a cloud server and stores a low-resolution image corresponding to the original image included in the image frame therein. In this case, the original image may be found using the low-resolution image while reducing the amount of information stored in the multimedia device. The original image included in the encoded image frame may not be encrypted. If the encoded image frame includes a non-encrypted original image, the cloud server may encrypt and store the original image included in the encoded image frame. Moreover, the cloud server may generate the low-resolution image corresponding to the original image included in the encoded image frame and deliver the generated low-resolution image to the multimedia device. To this end, the original image included in the encoded image frame may not be necessarily non-encrypted. That is, even when the encoded image frame includes the encrypted original image, the cloud server may not have any difficulty in generating the low-resolution image and delivering the generated low-resolution image to the multimedia device.

Hereinafter, various embodiments to be proposed will be described in detail with reference to the accompanying drawings.

FIG. 1 is a block diagram of an image processing device that performs encoding with respect to an original image in a multimedia device according to various embodiments of the present disclosure.

Referring to FIG. 1, an image processing device may include an input interface 110, an image processor 120, and an output interface 130. The input interface 110 receives an original image for encryption and delivers the received original image to the image processor 120.

According to an embodiment of the present disclosure, the original image may be included in a payload of the image frame and may be input to the input interface 110. The original image included in the payload of the image frame may be encoded by a predetermined image encoding scheme. In this case, the structure of the image frame may be determined according to the image encoding scheme used to encode the original image. For example, if the image encoding scheme is JPEG, the image frame may have a JPEG bitstream structure.

The image processor 120 configures the encrypted image frame by using the original image.

According to an embodiment of the present disclosure, the image processor 120 extracts the original image recorded in the payload of the image frame input from the input interface 110. If the extracted original image has been encoded by a predetermined encoding scheme, the image processor 120 may decode the encoded original image. The image processor 120 may use header information of the image frame to decode the encoded original image.

The image processor 120 generates a low-resolution image corresponding to the original image. For example, the image processor 120 may select a particular area from the entire area of the original image, extract an image corresponding to the selected area, and generate a low-resolution image based on the extracted image. The particular area may be set by an area indicating characteristics of the original image, that is, an area facilitating identification of the original image. The image processor 120 generates a related image by using meta information of the original image and uses the generated related image as a low-resolution image. When the related image is generated using the meta information, information may be included to facilitate identification of the original image.

Moreover, the image processor 120 reduces the size of the original image and generates the low-resolution image by using the size-reduced original image or generates an image that is recognizable by the user by performing processing, such as blurring, on the original image, and uses the generated image as the low-resolution image.

The image processor 120 encrypts the original image and generates the encrypted original image. The image processor 120 configures an encrypted image frame including the generated low-resolution image and the generated encrypted original image. The low-resolution image may be encrypted to configure a transmission frame. In this case, an encryption scheme for encrypting the low-resolution image may be different from an encryption scheme for encrypting the original image. For example, an encryption level of the encryption scheme for encrypting the low-resolution image may be lower than an encryption level of the encryption scheme for encrypting the original image.

According to an embodiment of the present disclosure, the image processor 120 selects a parameter to be encrypted based on the low-resolution image and encrypts the selected parameter. The image processor 120 may also select a parameter to be encrypted based on the low-resolution image, select particular bits of the selected parameter, and encrypt the selected particular bits.

According to an embodiment of the present disclosure, the encrypted image frame may include a first image field, an identity field, and a second image field. The image processor 120 records the low-resolution image in the first image field, the encrypted original image in the second image field, and maker information in the identity field. The maker information is information indicating whether the encrypted image frame includes the second image field.

According to an embodiment of the present disclosure, the image processor 120 records the low-resolution image in place of the original image recorded in the payload of the image frame, uses the identity information recorded in a field indicating an end of the image frame as the maker information, and adds the second image field recording the encrypted original image therein behind the maker information, thereby configuring the encrypted image frame. The identity information indicating the end of the image frame may be defined corresponding to the encoding scheme used to encode the original image.

According to an embodiment of the present disclosure, the first image field forming the encrypted image frame may include one recording area or multiple recording areas. For example, the first image field does not necessarily include one low-resolution image. For example, multiple low-resolution images may be sequentially recorded in the first image field. In this case, the multiple low-resolution images recorded in the first image field may be distinguished by preset information (bit values).

According to an embodiment of the present disclosure, the second image field forming the encrypted image frame may have one recording area or multiple recording areas. For example, the second image field does not necessarily include one encoded original image. The multiple encoded original images may be sequentially recorded in the second image field. In this case, the multiple encoded original images recorded in the second image field may be distinguished by preset information (bit values). The preset information may be disposed between the encoded original images or may be added at a time at a pre-agreed position.

According to an embodiment of the present disclosure, the number of encoded original images disposed in the second image field may not be necessarily equal to the number of low-resolution images disposed in front of the first image field. For example, one encoded original image may be disposed in the second image field and multiple low-resolution images may be disposed in the first image field. On the other hand, multiple encoded original images may be disposed in the second image field and one low-resolution image may be disposed in the first image field.

According to an embodiment of the present disclosure, the encoded original image disposed in the second image field may be resized based on the low-resolution image disposed in the first image field. For example, data corresponding to an area overlapping with the low-resolution image may be removed from the encoded original image and only data corresponding to the remaining area of the encoded original image may be recorded in the second image field.

The image processor 120 may add an extra information field between the identity field and the second image field to configure the encrypted image frame. In the extra information field, information used for decryption of the encrypted original image may be recorded.

The output interface 130 outputs the encrypted image frame generated by the image processor 120 to a target. The target may be determined corresponding to a processing scheme for the encrypted image frame. For example, when the encrypted image frame is recorded in the output interface 130, the output interface 130 may output the encrypted image frame to an internal memory. In another example, when the encrypted image frame is delivered to an external device (e.g., a cloud server), the output interface 130 may output the encrypted image frame to a transmitter.

The image processor 120 stores the low-resolution image in a memory (not shown) to correspond to image identification information. The image identification information may be defined to match the low-resolution image with the encrypted original image transmitted to an external device (the cloud server) through the encrypted image frame. The image identification information may be recorded in a designated field of the encrypted image frame.

According to an embodiment of the present disclosure, the image processor 120 displays one or multiple low-resolution images out of the low-resolution images stored in a memory on a display (not shown) according to an external request.

According to an embodiment of the present disclosure, the image processor 120 sends a request for a thumbnail image to an external device (the cloud server) through the output interface 130 and receives the low-resolution image from the external device in response to the request. The image processor 120 displays the low-resolution image received from the external device on the display (not shown).

Upon receiving a request for providing the original image corresponding to the displayed low-resolution image, the image processor 120 sends a request for the encrypted original image to the external device (the cloud server) by using image identification information stored corresponding to the displayed low-resolution image. Upon receiving the encrypted original image through the input interface 110, the image processor 120 decrypts the received encrypted original image. The image processor 120 displays the decrypted original image on the display (not shown).

Figure 2:
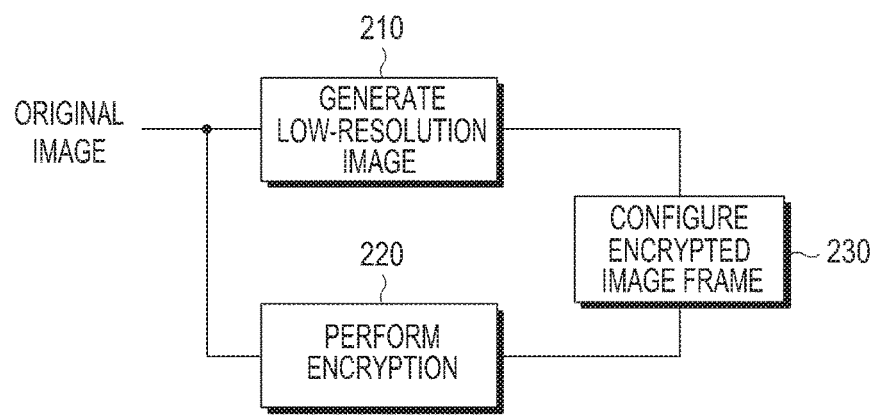
FIG. 2 is a conceptual block diagram for image processing to configure an encrypted image frame in an image processing device according to various embodiments of the present disclosure.

FIG. 2 is a conceptual block diagram for image processing to configure an encrypted image frame in an image processing device according to various embodiments of the present disclosure.

Referring to FIG. 2, the multimedia device generates a low-resolution image from an original image in operation 210. The low-resolution image may be an example of thumbnail images. The multimedia device generates a thumbnail image based on a policy of the original image. For example, the thumbnail image may be generated by performing resizing, quantization level adjustment, and cropping with respect to the original image. The thumbnail image may also be generated using the same method as used to generate the low-resolution image.

The thumbnail image may be encrypted based on a preset scheme. For example, for the thumbnail image, a parameter to be encrypted may be selected and encrypted or particular bits of the parameter to be encrypted may be selected and encrypted.

The multimedia device encrypts the original image by using a predetermined encryption scheme and outputs the original image encrypted by the encryption in operation 220. For example, if the low-resolution image has been generated by using an image in a particular area of the original image, the multimedia device may encrypt an image in the remaining area of the original image except for the image in the particular area.

The multimedia device may provide extra information used for decryption of the encrypted original image. For example, the multimedia device may provide information about a key used for encryption (an encryption key) and an encryption scheme as extra information or may provide information used for decryption based on the provided encryption key and the encryption scheme as extra information. If encryption of the original image is selectively applicable, the extra information may further include information indicating whether the original image has been encrypted.

The multimedia device configures an encrypted image frame using the generated at least one low-resolution image and the encrypted at least one original image in operation 230. For example, the encrypted image frame may include a header and a payload. The payload may include at least one low-resolution image and at least one encrypted original image. The payload may include a marker indicating that the at least one encrypted original image is included therein. A position at which the marker is recorded in the payload may precede a position at which the encrypted original image is recorded. That is, in the payload, a field (e.g., Fake Payload) in which the at least one low-resolution image is recorded, a field in which the marker is recorded, and a field in which the at least one encrypted original image is recorded may be sequentially arranged in that order.

If extra information corresponding to encryption is provided, the payload of the encrypted image frame may include a field in which the provided extra information is to be recorded. For example, the field in which the extra information is recorded may be arranged between the field in which the marker is recorded and the field in which the encrypted original image is recorded.

The multimedia device may record information for the low-resolution image in the header of the encrypted image frame. The header of the encrypted image frame may be "Fake Header". In this case, the multimedia device may add an extra header field to a payload of the encrypted image frame. The multimedia device records information for the at least one encrypted original image in the extra header field. The multimedia device encrypts information for the at least one encrypted original image to be recorded in the extra header field. In this case, the extra header field may be "Encrypted Header".

Figure 3:
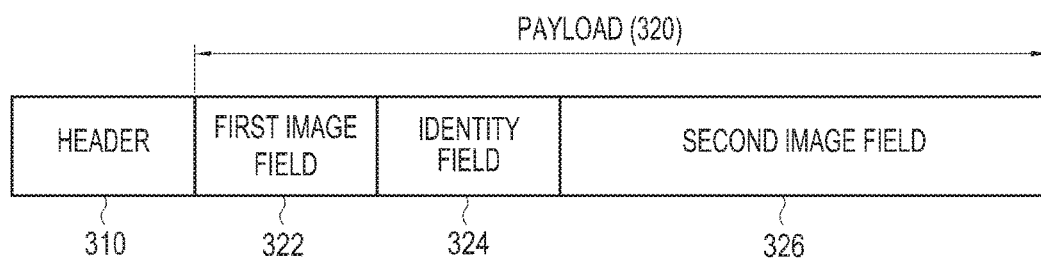
FIG. 3 illustrates an example of a structure of an encrypted image frame according to various embodiments of the present disclosure.

FIG. 3 illustrates an example of a structure of an encrypted image frame according to various embodiments of the present disclosure.

Referring to FIG. 3, the encrypted image frame may include a header 310 and a payload 320. In the header 310, information about the encrypted image frame may be recorded. In the header 310, information about data recorded in the payload 320 may be recorded. In the payload 320, at least one low-resolution image and at least one encrypted original image may be recorded.

According to an embodiment of the present disclosure, the payload 320 may include a first image field 322, an identity field 324, and a second image field 326. In the first image field 322, at least one low-resolution image may be recorded. The at least one low-resolution image recorded in the first image field 322 may be encrypted using a predetermined encryption scheme. In the second image field 326, at least one original image may be recorded. The at least one original image recorded in the second image field 326 may be encrypted using a predetermined encryption scheme.

The encryption scheme for encrypting the low-resolution image may be different from the encryption scheme for encrypting the original image. For example, an encryption level of the encryption scheme for encrypting the low-resolution image may be lower than an encryption level of the encryption scheme for encrypting the original image.

The maker information may be recorded in the identity field 324. The maker information indicates whether the encrypted image frame includes the second image field 326. The maker information may be used to indicate whether the original image included in the second image field 326 has been encrypted.

Figure 4:
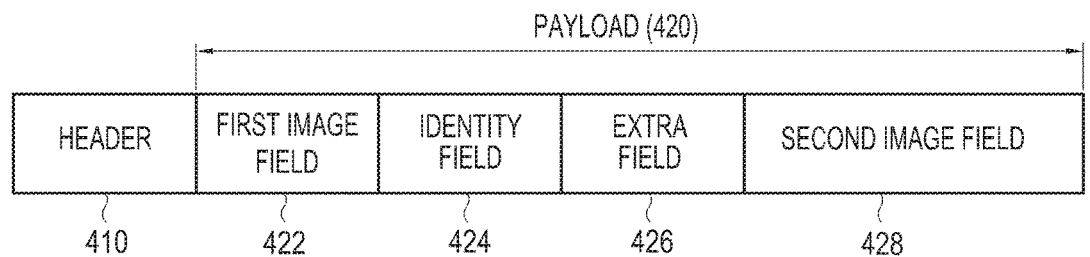
FIG. 4 illustrates another example of a structure of an encrypted image frame according to various embodiments of the present disclosure.

FIG. 4 illustrates another example of a structure of an encrypted image frame according to various embodiments of the present disclosure.

Referring to FIG. 4, the structure of the encrypted image frame shown in FIG. 4 has an extra field 426 in a payload 420 in the structure of the encrypted image frame shown in FIG. 3. That is, the payload 420 of the encrypted image frame may include a first image field 422, an identity field 424, an extra field 426, and a second image field 428. In the extra field 428, extra information such as information about a key used for encryption (an encryption key), an encryption scheme, or the like is recorded. If the encryption of the original image is selectively applicable, the extra information may further include information indicating whether the original image has been encrypted.

In the header 410 of the encrypted image frame, information for the encrypted original image recorded in the second image field 428 may be recorded in addition to information for the encrypted image frame.

According to an embodiment of the present disclosure, in the header 410 of the encrypted image frame, information for the low-resolution image recorded in the first image field 422 may be further recorded in addition to the information for the encrypted image frame. In this case, the payload 420 may further include an extra header field (not shown). In the extra header field, the information for the encrypted original image recorded in the second image field 428 may be recorded. For example, the information for the encrypted original image may be encrypted using a predetermined encryption scheme and added to the extra header field.

FIGS. 5A to 5C illustrates examples of an image frame and an encrypted image frame when proposed various embodiments are applied to a multimedia device that encodes an original image by using JPEG according to various embodiments of the present disclosure.

Referring to FIGS. 5A to 5C, an image frame generated when an original image is encoded using JPEG as an encoding scheme may include a start of image (SOI) field, a payload, and an end of image (EOI) field as shown in FIG. 5A.

In the SOI field, maker information indicating the start of the original image is recorded. In the header, information such as JPEG as a coding scheme, an image size, a quantization table, a Huffman table, and so forth may be recorded. In the payload, the original image that is actually encoded is recorded. In the EOI field, marker information indicating the end of the original image is recorded.

According to an embodiment of the present disclosure, an encrypted image frame generated by an image processing device may include an SOI field, a header, a thumbnail field, an EOI field, and an encrypted payload as shown in FIG. 5B.

According to an embodiment of the present disclosure, the encoded original image recorded in the payload of the image frame shown in FIG. 5A is decoded, and the thumbnail image is obtained from the decoded original image. A thumbnail image may be obtained directly from the encoded original image. The obtained thumbnail image is recorded in the payload of the image frame shown in FIG. 5A (the thumbnail field of the encrypted image frame shown in FIG. 5B). The remaining space after recording of the thumbnail image may be used for other purposes or may be zero-padded. In this case, the image processing device may obtain the thumbnail image recorded in the thumbnail field of the encrypted image frame shown in FIG. 5B without a special difficulty.

Information recorded in the EOI field of the image frame shown in FIG. 5A may be used as particular marker information. The particular marker information may be used to indicate that the encrypted payload is added behind the EOI field. In the encrypted payload, the encrypted original image obtained by encrypting the original image using a predetermined encryption scheme may be recorded.

In this case, the image processing device recognizes that the original image recorded in a field following the EOI field has been encrypted using a predetermined encryption scheme, by identifying the information recorded in the EOI field.

A codec recognizes that information does not exist after a particular signal (e.g., the information recorded in the EOI field), and does not perform decoding. Thus, when the image processing device decodes the encrypted image frame shown in FIG. 5B, the image processing device may decode only the thumbnail image.

By using such characteristics, an extra information field is added between the EOI field and the encrypted payload to configure the encrypted image frame FIG. 5B. In the extra information field, extra information about encryption or non-encryption, a key for encryption (an encryption key), an encryption scheme, and so forth may be recorded.

Figure 6:
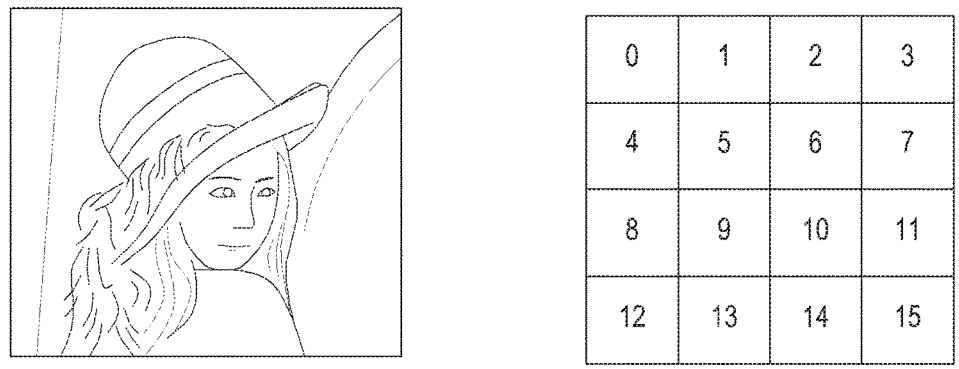
FIG. 6 illustrates a procedure for processing an original image in an image processing device according to various embodiments of the present disclosure.
Figure 6:
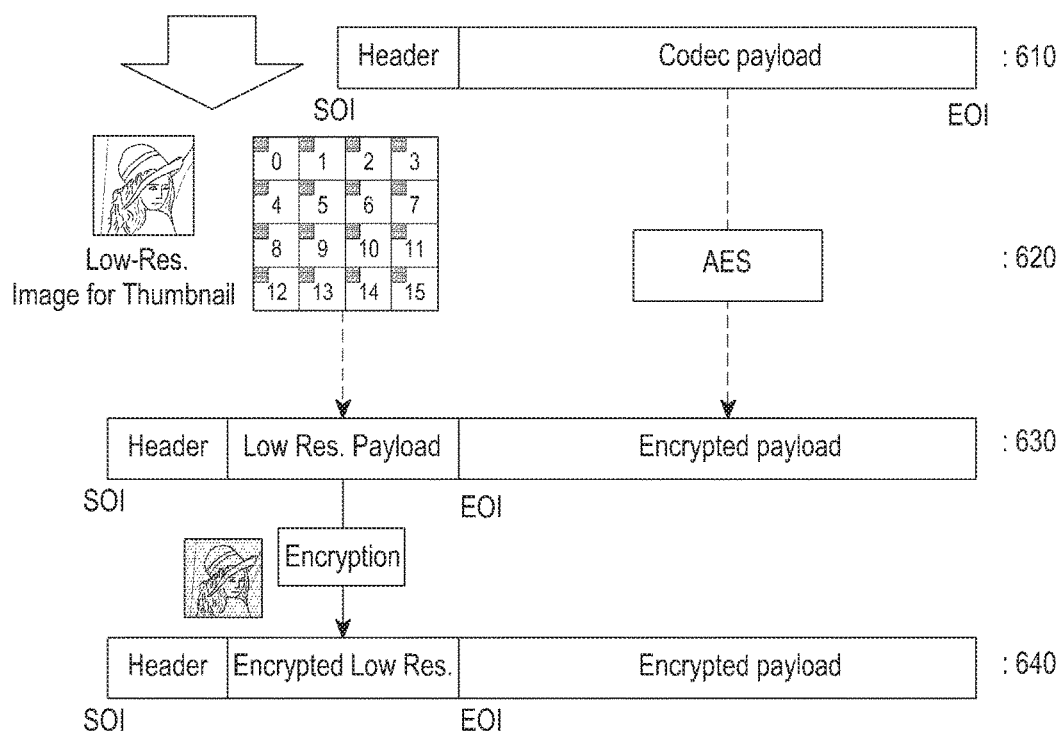

FIG. 6 illustrates a procedure for processing an original image in an image processing device according to various embodiments of the present disclosure.

Referring to FIG. 6, the image processing device encodes an original image including sixteen image blocks by using a predetermined encoding scheme and configures an image frame using the encoded original image in operation 610. The image frame may be configured using an SOI, a header, a payload, and an EOI.

The image processing device generates a low-resolution image for a thumbnail and performs encryption with respect to the encoded original image by using an advanced encryption standard (AES) method or the like in operation 620. For example, the low-resolution image may be generated by extracting some images from each of the sixteen image blocks of the original image.

The image processing device records the generated low-resolution image between the header and the EOI of the image frame and records the encrypted original image after the EOI, thus configuring the encrypted image frame in operation 630.

The image processing device encrypts the low-resolution image recorded in the encrypted image frame by using a predetermined encryption scheme in operation 640. The encryption scheme used to encrypt the low-resolution image may be different from the encryption scheme used to encrypt the encoded original image. This example is the same as disclosed above.

Figure 7:
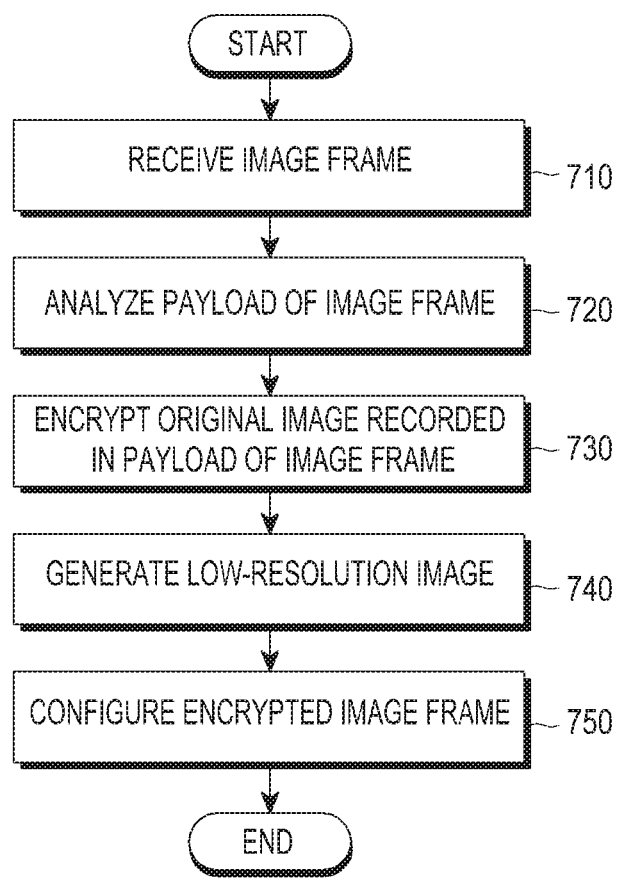
FIG. 7 is a flowchart illustrating a control flow for performing encryption in an image processing device according to various embodiments of the present disclosure.

FIG. 7 is a flowchart illustrating a control flow for performing encryption in an image processing device according to various embodiments of the present disclosure.

Referring to FIG. 7, the image processing device receives an image frame in operation 710. The image frame may be generated by a coder supporting a predetermined encoding scheme. Thus, the image frame may include an encoded original image. A structure of the image frame may be defined by an encoding scheme applied to encode the original image.

The image processing device analyzes a payload of at least one received image frame in operation 720, and encrypts the original image recorded in the payload by using an encryption scheme selected based on the analysis result in operation 730. The AES method may be selected as the encryption scheme.

The image processing device generates a low-resolution image, which is a thumbnail image, corresponding to one original image or each of multiple original images in operation 740. The image processing device configures an encryption image frame including at least one encrypted original image and at least one low-resolution image in operation 750. The encrypted image frame may be generated by re-configuring the image frame using the at least one encrypted original image and the at least one low-resolution image.

The image processing device generates extra information about encryption and non-encryption, an encryption key, an encryption scheme, and so forth, which is used for encryption of the original image, and uses the generated extra information for encryption of the original image. In this case, the fake payload is defined in the encrypted image frame and the low-resolution image may be recorded in the defined fake payload.

Figure 8:
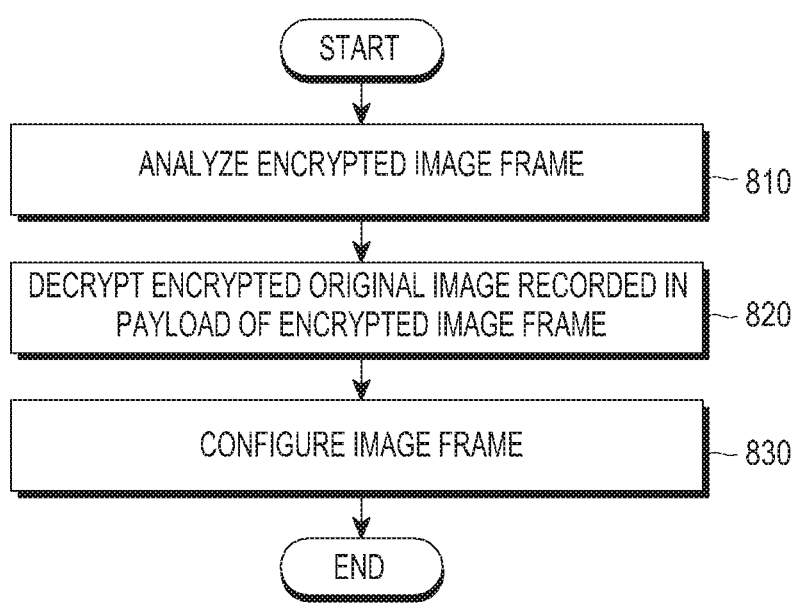
FIG. 8 is a flowchart illustrating a control flow for performing decryption in an image processing device according to various embodiments of the present disclosure.

FIG. 8 is a flowchart illustrating a control flow for performing decryption in an image processing device according to various embodiments of the present disclosure.

Referring to FIG. 8, the image processing device analyzes maker information (e.g., an EOI) included in an encrypted image frame and recognizes a position of an encrypted payload of the encrypted image frame based on the analysis result in operation 810.

The image processing device decrypts at least one encrypted original image recorded in the encrypted payload of the encrypted image frame by using the recognized position of the encrypted payload in operation 820. The image processing device obtains information used for decrypting at least one encrypted original image from extra information or extra header information recorded in an extra field of the encrypted image frame. To decrypt the at least one encrypted original image, the AES method may be used.

For example, the image processing device may extract the extra information included in the encrypted image frame and decrypt the at least one encrypted original image recorded in the encrypted payload of the encrypted image frame based on the extracted extra information.

The image processing device configures an image frame based on a decoding scheme to be used to decode the original image in operation 830.

In the present disclosure, information for identifying contents is stored in the multimedia device and large-size information that is actually encrypted is stored in the cloud server, thereby improving user's use convenience, reducing a memory size of the multimedia device, and reducing the amount of use of a network.

Figure 9:
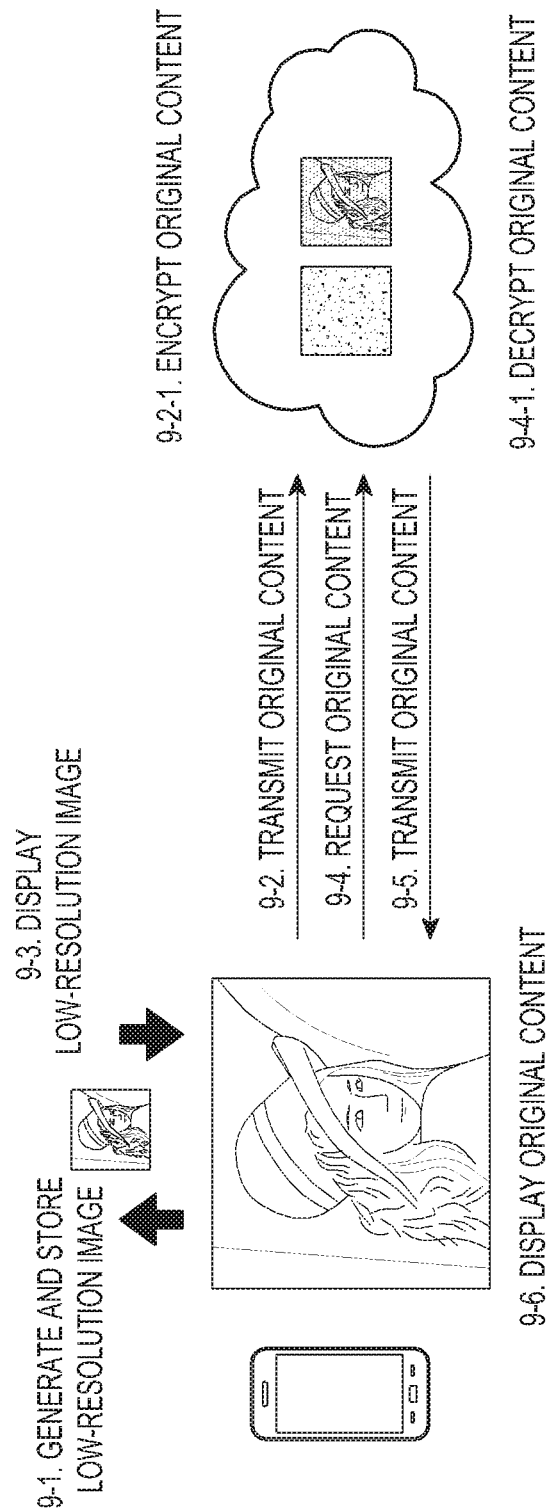
FIG. 9 is a conceptual diagram illustrating an example of a signal processing procedure for contents data processing according to various embodiments of the present disclosure.

FIG. 9 is a conceptual diagram illustrating an example of a signal processing procedure for contents data processing according to various embodiments of the present disclosure. That is, in FIG. 9, a scenario is assumed in which the multimedia device generates a low-resolution image, searches for contents (e.g., an original image) stored in the cloud server by using the generated low-resolution image, and desired contents data is obtained from the cloud server based on the search. For convenience, the following description will be made assuming that contents exchanged between the multimedia device and the cloud server are original images corresponding to a still image or a moving image.

Referring to FIG. 9, the multimedia device is provided with one image frame or multiple image frames corresponding to encryption targets, generates at least one low-resolution image corresponding to an original image included in the provided image frame or multiple image frames, and stores the generated at least one low-resolution image in a memory in operation 9-1. In the following description, it is assumed that an encrypted image frame is generated using one original image and one low-resolution image. However, the same description may be applied to a case where an encrypted image frame is generated using multiple original images and/or multiple low-resolution images.

The memory that stores the low-resolution image therein may be located inside the multimedia device or in an external place accessible by the multimedia device. The original image included in the image frame may be encoded using a predetermined encoding scheme. The encoding scheme is not restrictively applied. For example, any encoding scheme for encoding a still image or a moving image may be applied without being additionally changed. However, the multimedia device may consider the encoding scheme which has been used to generate the low-resolution image.

The multimedia device transmits the original image included in the image frame to the cloud server by using a transmission frame having a pre-agreed format in operation 9-2. For example, the transmission frame may be an encrypted image frame obtained by reconfiguring an image frame. The reconfiguring for the encrypted image frame has already been described above. In this case, encryption with respect to the original image included in the transmission frame may be selectively applied. If the original image included in the transmission frame has not been encrypted, the cloud server having received the transmission frame encrypts the original image included in the transmission frame in operation 9-2-1.

The multimedia device does not necessarily include the low-resolution image generated corresponding to the original image in the transmission frame. If the low-resolution image is included in the transmission frame, the low-resolution image needs to have a structure considering compatibility like the encrypted image frame proposed above. In this case, the low-resolution image included in the transmission frame may be shared with other multimedia devices.

The multimedia device displays the stored low-resolution image and provides a search for a displayable original image based on the displayed low-resolution image in operation 9-3. For example, the multimedia device may sequentially display a stored low-resolution image in response to a request from a user and monitor whether the displayed low-resolution image is selected by the user. The low-resolution image has not been encrypted, such that the multimedia device may not decrypt the low-resolution image to display the low-resolution image.

Upon receiving a request for an original image corresponding to the displayed low-resolution image, the multimedia device sends a request for the original image to the cloud server in operation 9-4. For example, when sending the request for the original image, the multimedia device may provide information for identifying the original image to the cloud server. To this end, the multimedia device assigns identity information to the low-resolution image when the low-resolution image is stored, and provides the assigned identity information to the cloud server. The identity information may be provided together when the original image is transmitted to the cloud server. According to an embodiment, the cloud server transmits the original image to the multimedia device by using the encrypted image frame proposed above.

The cloud server reads the stored original image in response to the request from the multimedia device and transmits the read original image to the multimedia device in operation 9-5. The stored original image has been encrypted, such that the cloud server decrypts the encrypted original image in operation 9-4-1.

Once receiving the original image from the cloud server, the multimedia device displays the received original image through a display means in operation 9-6. To this end, the multimedia device decrypts the original image based on a predetermined decryption scheme. The multimedia device may also decode the original image by using a predetermined codec after the decryption.

As stated above, the multimedia device may save a recording space because of not having to store all original images and may easily search for an original image by using a low-resolution image.

Figure 10:
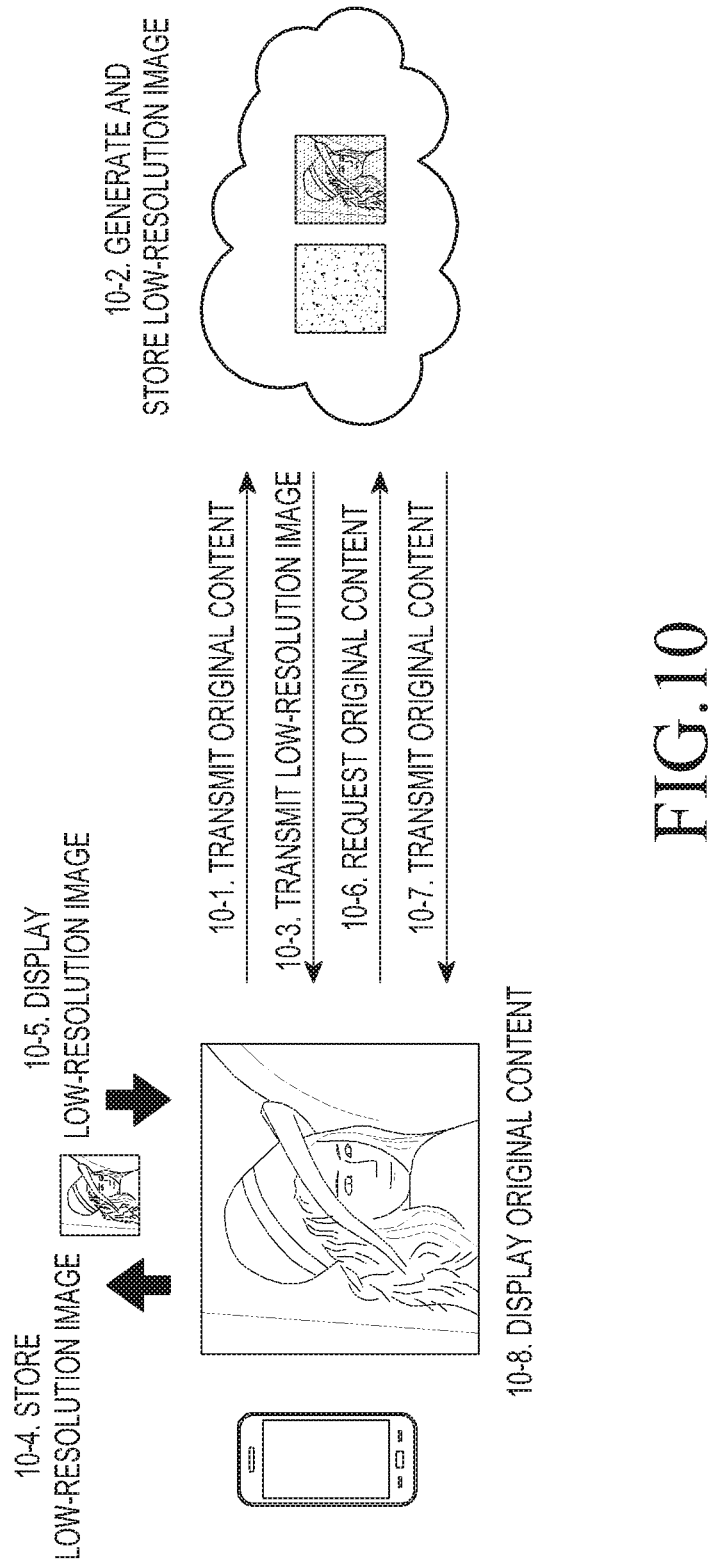
FIG. 10 is a conceptual diagram illustrating another example of a signal processing procedure for contents data processing according to various embodiments of the present disclosure.

FIG. 10 is a conceptual diagram illustrating another example of a signal processing procedure for contents data processing according to various embodiments of the present disclosure. That is, in FIG. 10, a scenario is assumed in which a cloud server provides a low-resolution image generated by original content provided from a multimedia device to the multimedia device. For convenience, the following description will be made assuming that contents exchanged between the multimedia device and the cloud server are original images corresponding to a still image or a moving image.

Referring to FIG. 10, the multimedia device is provided with an image frame and transmits an original image included in the image frame to the cloud server by using a transmission frame having a pre-agreed format in operation 10-1. For example, the transmission frame may be an encrypted image frame obtained by reconfiguring the image frame. The reconfiguring for the encrypted image frame has already been described above. In this case, encryption of the original image included in the transmission frame may be selectively applied. If the original image included in the transmission frame has not been encrypted, the cloud server having received the transmission frame may encrypt the original image included in the transmission frame.

The cloud server generates a low-resolution image corresponding to the original image included in the transmission frame transmitted from the multimedia device and stores the generated low-resolution image in a memory in operation 10-2. The original image included in the image frame may be encoded by a predetermined encoding scheme. In this case, the encoding scheme is not restrictively applied. That is, any encoding scheme for encoding a still image or a moving image may be applied without being additionally changed. However, the multimedia device may consider the encoding scheme which has been used to generate the low-resolution image.

The cloud server transmits the generated low-resolution image to the multimedia device in operation 10-3. The cloud server may compulsorily transmit the low-resolution image, but may also transmit the low-resolution image in response to a request from the multimedia device. The low-resolution image transmitted to the multimedia device by the cloud server may not be encrypted, such that the low-resolution image may be shared with various multimedia devices. However, if the low-resolution image uses a predetermined encoding scheme, another multimedia device that desires to share the low-resolution image with the multimedia device needs to include a codec corresponding to the encoding scheme.

The multimedia device stores the low-resolution image provided from the cloud server in the memory in operation 10-4. The memory that is to store the low-resolution image may be located inside the multimedia device or in an external place accessible by the multimedia device. The original image included in the image frame may be encoded using a predetermined encoding scheme. The encoding scheme is not restrictively applied. For example, any encoding scheme for encoding a still image or a moving image may be applied without being additionally changed.

The multimedia device displays the stored low-resolution image and provides a search for a displayable original image based on the displayed low-resolution image in operation 10-5. For example, the multimedia device may sequentially display a stored low-resolution image in response to a request from a user and monitor whether the displayed low-resolution image is selected by the user. The low-resolution image has not been encrypted, such that the multimedia device may not decrypt the low-resolution image to display the low-resolution image.

Upon receiving a request for an original image corresponding to the displayed low-resolution image, the multimedia device sends a request for the original image to the cloud server in operation 10-6. For example, when sending the request for the original image, the multimedia device may provide information for identifying the original image to the cloud server. To this end, the multimedia device assigns identity information to the low-resolution image when the low-resolution image is stored, and provides the assigned identity information to the cloud server. The identity information may be provided together when the original image is transmitted to the cloud server.

The cloud server reads the stored original image in response to the request from the multimedia device, and transmits the read original image to the multimedia device in operation 10-7. If the stored original image has been encrypted, the cloud server may decrypt the encrypted original image.

Upon receiving the original image from the cloud server, the multimedia device displays the received original image through a display means in operation 10-8. To this end, the multimedia device decrypts the original image based on a predetermined decryption scheme. The multimedia device may also decode the original image by using a predetermined codec after the decryption.

As described above, the multimedia device may save a recording space because of not having to all original images and may easily search for an original image by using a low-resolution image.

For example, in various embodiments of the present disclosure described above, the description has been made in a case where an encrypted image frame includes one low-resolution image (a thumbnail image) and one original image. However, as mentioned above, various embodiments proposed herein are not limited to the case where the encrypted image frame includes one low-resolution image and one original image. That is, the encrypted image frame may include one low-resolution image and multiple original images or may include multiple low-resolution images and one original image. The encrypted image frame may also include multiple low-resolution images and multiple original images.

As is apparent from the foregoing description, according to various embodiments of the present disclosure, the multimedia device may be easily identify an image and may also protect an original image stored in a cloud server, by using a low-resolution image stored therein. In this way, a storage space of the multimedia device may be saved and power consumption generated by image processing may be reduced.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing an image by a multimedia device, the method comprising:
    obtaining a thumbnail image of an original image;
    encrypting the original image using a first encryption scheme; and
    generating an encrypted image frame, the encrypted image frame comprising a first image field which includes the obtained thumbnail image and an identity field following the first image field,
    wherein marker information in the identity field indicates whether the encrypted image frame comprises a second image field which includes the encrypted original image, and wherein the generating of the encrypted image frame comprises:
configuring a field in which identity information indicating an end of the image frame is recorded as the identity field, and
adding the second image field in which the encrypted original image is recorded behind the identity field, to generate the encrypted image frame.

2. The method of claim 1, further comprising:
extracting the original image from a payload of an image frame generated based on a predetermined image encoding scheme.

3. The method of claim 2, wherein the generating of the encrypted image frame further comprises:
configuring the first image field by adding the generated thumbnail image in place of the original image recorded in the payload of the image frame.

4. The method of claim 3, wherein the identity information is defined corresponding to an image encoding scheme used to encode the original image.

5. The method of claim 1, wherein the generating of the encrypted image frame comprises adding an extra field between the identity field and the second image field and recording information used for decrypting the encrypted original image in the extra field.

6. The method of claim 1, further comprising:
transmitting the generated encrypted image frame to a cloud server; and
storing the obtained thumbnail image to correspond to image identity information,
wherein the image identity information is defined to match the obtained thumbnail image with the encrypted original image transmitted to the cloud server through the encrypted image frame.

7. The method of claim 6, further comprising:
displaying the selected thumbnail image if the stored thumbnail image is selected;
receiving the encrypted original image from the cloud server by using the image identity information stored corresponding to the displayed thumbnail image, upon receiving a request for an original image corresponding to the displayed thumbnail image;
decrypting the received encrypted original image; and
displaying the decrypted original image.

8. The method of claim 1,
wherein the generating of the encrypted image frame comprises:
encrypting a thumbnail image to be recorded in the first image field by using a second encryption scheme, and
wherein the second encryption scheme is different from the first encryption scheme, and an encryption level of the second encryption scheme is lower than an encryption level of the first encryption scheme.

9. The method of claim 6, further comprising:
sending a request for a thumbnail image to the cloud server;
displaying a thumbnail image provided from the cloud server;
sending a request for an original image corresponding to the displayed thumbnail image to the cloud server if a request for the original image corresponding to the displayed thumbnail image is received;
decrypting an encrypted original image provided from the cloud server; and
displaying the decrypted original image.

10. The method of claim 1, wherein the encrypting of the original image comprises:
removing an image overlapping with the thumbnail image from the original image, and
encrypting the original image from which the overlapping image has been removed, by using the first encryption scheme.

11. A device for processing an image, the device comprising:
an input interface;
an image processor configured to:
obtain a thumbnail image of an original image included in an image frame provided by the input interface,
encrypt the original image using a first encryption scheme, and
generate an encrypted image frame, the encrypted image frame comprising a first image field which includes the obtained thumbnail image and an identity field following the first image field; and
an output interface configured to output the encrypted image frame generated by the image processor,
wherein marker information in the identity field indicates whether the encrypted image frame comprises a second image field which includes the encrypted original image, and
wherein the image processor is further configured to:
configure a field in which identity information indicating an end of the image frame is recorded as the identity field, and
add the second image field in which the encrypted original image is recorded behind the identity field, to generate the encrypted image frame.

12. The device of claim 11, wherein the original image is encoded using a predetermined image encoding scheme and recorded in a payload of the image frame.

13. The device of claim 12, wherein the image processor is further configured to:
configure the first image field by adding the generated thumbnail image in place of the original image recorded in the payload of the image frame.

14. The device of claim 13, wherein the identity information is defined corresponding to an image encoding scheme used to encode the original image.

15. The device of claim 11, wherein the image processor is further configured to:
add an extra field between the identity field and the second image field, and
record information used for decrypting the encrypted original image in the extra field.

16. The device of claim 11, further comprising:
a transmitter configured to transmit the generated encrypted image frame to a cloud server; and
a memory configured to store the obtained thumbnail image to correspond to image identity information,
wherein the image identity information is defined to match the obtained thumbnail image with the encrypted original image transmitted to the cloud server through the encrypted image frame.

17. The device of claim 16, wherein the image processor is further configured to:
display the selected thumbnail image if the thumbnail image stored in the memory is selected,
receive the encrypted original image from the cloud server by using the image identity information stored in the memory corresponding to the displayed thumbnail image upon receiving a request for an original image corresponding to the displayed thumbnail image, decrypt the received encrypted original image, and display the decrypted original image through a display.

18. The device of claim 11, wherein the image processor is further configured to encrypt a thumbnail image to be recorded in the first image field by using a second encryption scheme, and wherein the second encryption scheme is different from the first encryption scheme, and an encryption level of the second encryption scheme is lower than an encryption level of the first encryption scheme.

19. The device of claim 16, wherein the image processor is further configured to:

send a request for a thumbnail image to the cloud server, display the thumbnail image provided from the cloud server through a display, receive an original image corresponding to the displayed thumbnail image from the cloud server if a request for the original image corresponding to the displayed thumbnail image is received, decrypt an encrypted original image received from the cloud server, and display the decrypted original image through the display.

20. The device of claim 12, wherein the image processor is further configured to:

remove an image overlapping with the thumbnail image from the original image, encrypt the original image from which the overlapping image has been removed, by using the first encryption scheme, and record the encrypted original image in the second image field.

* * * * *